United States Patent Office 3,202,499
Patented Aug. 24, 1965

3,202,499
HERBICIDAL COMPOSITIONS AND METHOD FOR INHIBITING THE GROWTH OF PLANTS THEREWITH
Enrico Knüsli, Riehen, near Basel, Switzerland, assignor to J. R. Geigy A.-G., Basel, Switzerland
No Drawing. Filed Nov. 1, 1961, Ser. No. 149,170
Claims priority, application Switzerland, Nov. 2, 1960, 12,237/60
10 Claims. (Cl. 71—2.5)

The present invention relates to new triazine derivatives with valuable herbicidal properties, a process for their preparation, and their use for inhibiting the growth of plants; in addition the invention relates to weed control agents, which contain the new triazine derivatives as active substances.

2,4-diamino-s-triazines substituted in at least one amino group and containing a cyano group as a third substituent have previously not been known.

It has now been found that such s-triazine derivatives of the general formula

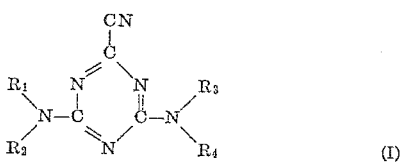

in which $R_1$ represents a lower alkyl, lower alkoxy(lower)alkyl or lower alkylmercapto(lower)alkyl radical, or a lower alkenyl, lower alkenyloxy(lower)alkyl or lower alkenylmercapto(lower)alkyl radical, and $R_2$, $R_3$ and $R_4$ independently of one another represent hydrogen atoms or radicals according to the definition for $R_1$, have an excellent herbicidal activity and are therefore suitable as active substances for weed control agents. By "lower" is meant an alkyl, alkenyl or alkoxy radical containing 1 to 5 carbon atoms.

The surprising discovery has been made that the halogen atom in 2-halo-4,6-diamino-s-triazines can be replaced by the cyano group by reaction with metal cyanides, especially KCN.

The process according to the invention for the preparation of the new s-triazine derivatives of the above-defined general Formula I is characterised in that a substituted 2-halo-4,6-diamino-s-triazine of the general formula

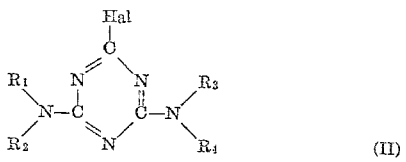

in which Hal signifies a halogen, especially chlorine or bromine and $R_1$, $R_2$, $R_3$ and $R_4$ have the meaning indicated above, is heated with at least one normal equivalent of a metal cyanide, especially KCN or with ammonium cyanide, in the presence of an inert organic solvent.

Instead of potassium cyanide, sodium cyanide and in some cases calcium cyanide and so on may also be used as the metal cyanides. A normal equivalent or any optional excess of such cyanides is used. The reaction is carried out in the hot and usually at the reflux temperature of the inert organic solvent used. Suitable higher-boiling inert organic solvents include especially dimethyl formamide, but the reaction may also be carried out in ethylene glycol diethyl ether or in diethylene glycol diethyl ether, etc. If desired the inert solvents may be distilled off at least partially during the reaction. Usually the reaction is completed after 6 to 12 hours heating under reflux.

The starting substances of the general Formula II are known compounds or can be easily prepared by known methods, e.g. from cyanuric chloride or cyanuric bromide by reaction with 2 mols of suitable amines.

Suitable starting substances of the general Formula II are, for example, the following:

2-chloro-4-amino-6-ethylamino-s-triazine,
2-chloro-4-amino-6-isopropylamino-s-triazine,
2-chloro- and
2-bromo-4,6-bis(ethylamino)-s-triazines,
2-chloro- and
2-bromo-4-methylamino-6-isopropylamino-s-triazines,
2-chloro- and
2-bromo-4-ethylamino-6-isopropylamino-s-triazines,
2-chloro- and
2-bromo-4,6-bis(isopropylamino)-s-triazines,
2-chloro- and
2-bromo-4-diethylamino-6-isopropylamino-s-triazines,
2-chloro- and
2-bromo-4,6-bis(diethylamino)-s-triazines,
2-chloro- and
2-bromo-4-diethylamino-6-ethylamino-s-triazines,
2-chloro- and
2-bromo-4-n-propylamino-6-isopropylamino-s-triazines,
2-chloro- or
2-bromo-4-ethylamino-6-allylamino-s-triazine,
2-chloro- and
2-bromo-4-isopropylamino-6-allylamino-s-triazines,
2-chloro- and
2-bromo-4,6-bis(allylamino)-s-triazines,
2-chloro-4-ethylamino-6-(γ-methoxypropylamino)-s-triazine,
2-chloro-4-isopropylamino-6-(γ-methoxypropylamino)-s-triazine,
2-chloro-4-ethylamino-6-(β-methoxyethylamino)-s-triazine,
2-chloro-4,6-bis-(γ-methoxypropylamino)-s-triazine,
2-chloro-4,6-bis-(β-ethoxyethylamino)-s-triazine,
2-chloro-4-ethylamino-6-(β-allyloxyethylamino)-s-triazine,
2-chloro-4-isopropylamino-6-(β-methylmercaptoethylamino)-s-triazine,
2-chloro-4-ethylamino-6-(β-ethylmercaptoethylamino)-s-triazine,
2-chloro-4,6-bis(γ-allylmercaptopropylamino)-s-triazine and so on.

Instead of the 2-chloro- and 2-bromo- compounds, also the corresponding 2-fluoro-4,6-diamino-s-triazines may be used as starting materials of the general Formula II.

The following examples are to illustrate more precisely the preparation of the new active substances according to the invention. Parts therein are parts by weight. These are to parts by volume as grammes are to cubic centimetres. The temperatures are given in degrees centigrade.

Example 1

20 parts of 2-chloro-4,6-bis-(ethylamino)-s-triazine are boiled under reflux for 6 hours with 10 parts of potassium cyanide in 200 parts by volume of dimethyl formamide. After this the reaction mixture is poured into a large amount of water and the crude product which precipitates is filtered off. After twice recrystallising from absolute ethanol and finally from ethyl acetate, the pure 2-cyano-4,6-bis-(ethylamino)-s-triazine obtained melts at 212–214°.

If 24.5 parts of 2-bromo-4,6-bis-(ethylamino)-s-triazine and 10 parts of potassium cyanide are used and the reaction is otherwise carried out in the same way as described above, the same 2-cyano-4,6-bis-(ethylamino)-s-triazine is obtained. It melts at 212–214°.

Example 2

24.5 parts of 2-chloro-4-diethylamino-6-isopropylamino-s-triazine are boiled under reflux for 6 hours with 10 parts of potassium cyanide in 200 parts by volume of dimethyl formamide. The reaction mixture is then poured into water, the oil phase is separated in a separating funnel, dissolved in ether, the ethereal solution is washed with water, dried and, after evaporation of the ether, distilled twice in a high vacuum, $B.P._{0.1}$ 117–118°.

The 2-cyano-4-diethylamino-6-isopropylamino-s-triazine obtained solidifies in the receiver and melts at 48–52°.

Example 3

20 parts of 2-chloro-4-methylamino-6-isopropylamino-s-triazine are reacted with 10 parts of KCN and 200 parts by volume of dimethyl formamide and the product is worked up, as indicated in Example 1. After recrystallising from ethanol and methylcyclohexane, the pure 2-cyano-4-methylamino-6-isopropylamino-s-triazine obtained melts at 131.5–134°.

Example 4

21.5 parts of 2-chloro-4-ethylamino-6-isopropylamino-s-triazine, as in Example 1, are reacted with 10 parts of KCN and 200 parts by volume of dimethyl formamide and the product is worked up. After recrystallising from ethanol and then from methylcyclohexane, the pure 2-cyano-4-ethylamino-6-isopropylamino-s-triazine obtained melts at 142–144°.

Example 5

Similarly to example 1, pure 2-cyano-4,6-bis-isopropylamino-s-triazine of M.P. 164–165° is obtained from 23 parts of 2-chloro-4,6-bis-isopropylamino-s-triazine after recrystallising from methylcyclohexane and then from hexane.

Example 6

Pure 2-cyano-4-n-propylamino-6-isopropylamino-s-triazine melting at 131–133° is obtained as in Example 1 from 23 parts of 2-chloro-4-n-propylamino-6-isopropylamino-s-triazine and recrystallisation from cyclohexane.

Example 7

77 parts of 2-chloro-4,6-bis-(diethylamino)-s-triazine are boiled under reflux for 12 hours with 30 parts of potassium cyanide and 500 parts by volume of dimethyl formamide. The greater part of the solvent is then evaporated off in vacuo, the residue is dissolved in benzene and washed with water. The crude product freed from benzene by evaporation is then distilled in high vacuum, $B.P._{0.35}$ 126–134°. The product solidifies in the receiver and is recrystallised from alcohol. The pure 2-cyano-4,6-bis-(diethylamino)-s-triazine obtained melts at 63–66°.

The following substances of formula I may be prepared in a way analogous to that described in the foregoing examples:

2-cyano-4-allylamino-6-isopropylamino-s-triazine, M.P. 124–126°,
2-cyano-4-isopropylamino-6-(γ-methoxypropylamino)-s-triazine, M.P. 100–102°,
2-cyano-4,6-bis-(β-ethoxyethylamino)-s-triazine, M.P. 97–99°,
2-cyano-4-amino-6-diethylamino-s-triazine,
2-cyano-4-isopropylamino-6-(β-methoxyethylamino)-s-triazine,
2-cyano-4-ethylamino-6-(β-ethoxyethylamino)-s-triazine,
2-cyano-4-ethylamino-6-(γ-allyloxypropylamino)-s-triazine,
2-cyano-4-isopropylamino-6-(γ-allyloxypropylamino)-s-triazine,
2-cyano-4-isopropylamino-6-(γ-methylmercaptopropylamino)-s-triazine,
2-cyano-4-ethylamino-6-(γ-methylmercaptopropylamino)-s-triazine,
2-cyano-4-isopylamino-6-(γ-allylmercaptopropylamino)-s-triazine.

The compounds mentioned above as well as further compounds of the general Formula I given at the beginning are particularly suitable as active substances for weed control agents, both for the selective suppression and destruction of weeds among cultivated plants as well as for the total destruction and prevention of undesired plant growth. By weeds are also meant here unwanted, e.g. previously grown, cultivated plants. The above-defined compounds are also suitable as active substances for carrying out other inhibiting effects on plant growth, especially defoliation, e.g. of cotton plants, acceleration of maturity by premature drying e.g. of potato plants, and also reduction of fruit set, extension of the harvesting period and storability.

The weed control agents according to the invention may be solutions, emulsions, suspensions, dusts or granular compositions, the form of application depending entirely on the purpose for which they are to be used. Suitable carriers are inert solid carriers, high boiling organic solvents, volatile solvents or water. Emulsifying or dispersing agents may be added to said carriers (especially when in water or when intended for use in water), to ensure proper dispersibility. All forms of application must merely ensure that the active substance is finely distributed. Especially in the total destruction of plant growth, premature drying and defoliation, the action can be intensified by the use of carriers which are themselves phytotoxic, such as, for example, high boiling mineral oil fractions; on the other hand the selectivity of the growth inhibition is in general more pronounced by the use of carriers inert towards plants, e.g. in selective weed control.

For the production of solutions, higher-boiling organic liquids such as mineral oil fractions or coal tar oils are especially suitable, and also vegetable and animal oils. In order to facilitate the solution of the active substances in these liquids, small amounts of organic liquids with better dissolving power and usually lower boiling point may be added if desired, that is, solvents such as alcohols, e.g. ethanol or isopropanol, ketones e.g. acetone, butanone or cyclohexanone, diacetone alcohol, cyclic hydrocarbons, e.g. benzene, toluene or xylene, chlorinated hydrocarbons, e.g. tetrachloroethane or ethylene chloride, or mixtures of the above substances.

The most important forms of aqueous preparations are emulsions and dispersions. The substances are homogenised in water as such or in one of the above-mentioned solvents, preferably by means of emulsifying or dispersing agents. Quaternary ammonium compounds may be mentioned as examples of cationic emulsifying or dispersing agents, while as examples of anionic emulsifying agents are soap, soft soap, alkali met salts of aliphatic long-chain sulphuric acid monoesters, aliphatic-aromatic sulphonic acids or long-chain alkoxyacetic acids, and as non-ionic emulsifying agents are polyethylene glycol ethers of fatty alcohols or alkyl phenols and polycondensation products of ethylene oxide. On the other hand, liquid or paste-like concentrates can also be prepared consisting of active substance, emulsifying or dispersing agent and, if necessary, solvent which are suitable for dilution with water.

Dusts and scattering agents, the latter also including granular compositions, may be prepared by mixing or grinding together the active substance and a solid carrier. As carrier may be used talcum, diatomaceous earth, kaolin, bentonite, calcium carbonate, tricalcium phosphate, sand, and also sawdust, cork powder and other materials of vegetable origin. On the other hand the substances may also be mounted on the carriers by means of a volatile solvent. Powdered preparations and pastes can be made able to be suspended in water and used as sprays by addition of wetting agents, e.g. the above mentioned emulsifying agents, and protective colloids, e.g. spent sulphite liquor.

The various forms of application may be adapted more nearly to the purpose for which they are to be used in the usual way by addition of substances which improve or reduce the distribution and the power of penetration into the soil according to the depth of the roots of the weeds to be controlled. Likewise their biological action can be broadened by addition of substances with bactericidal or fungicidal properties, e.g. in order to produce a general sterilisation of the soil or, in selective weed control, for the protection of the cultivated plants from other harmful organisms. Substances which also influence the growth of plants, such as for example, 3-amino-1,2,4-triazole, may be wanted to accelerate the beginning of the action or, as for example, salts of $\alpha,\alpha$-dichloropropionic acid, may be wanted in some cases to broaden the spectrum of the herbicidal action. The combination with fertilisers means in some cases a saving in labour and may increase the capacity for resistance of the cultivated plants which are to be protected.

As noted in the foregoing, the aqueous forms of the application are chiefly emulsions and dispersions. In their preparation, typical cation active emulsifying agents that can be used are Katapol PN–430 of Antara Chemicals. Examples of anion active emulsifying agents and dispersing agents are Nekal BX–78 of Antara Chemicals, Ninata 402 of Ninol Laboratories Inc., Sellogen HR of Jacques Wolf & Co., Tinovetin B of J. R. Geity A.G., Duponol L–144–WDG of E. I. du Pont de Nemours and Co., the Emcols H–A, H–B and H–C of Emulsol Chemical Corporation. Among the non-ionic emulsifying agents, illustrations are Triton X–100 of Rohm & Haas Co., Agrimul 70A and 70B of Nopco Chemicals Co., mixtures of emlusifying agents can be used, e.g. anionic emulsifying agents in combination with non-ionic emulsifying agents of commercial blends of anionic and non-ionic emulsifying agents such as Toximul 500 of Ninol Laboratories, Agrimul GA of Nopco Chemical Co. and Emcol H–400, H–500, H–600, H–700 or H–800 of Emulsol Chemical Corporation.

Examples of typical forms of application are given below:

Example 8

10 parts of active substance described in Example 1 and 90 parts of talcum are ground as finely as possible in a ball mill, a pinned disc mill or another suitable mill. The mixture obtained serves as a dust.

In a similar manner, the active substance in Example 5 is compounded. The resulting mixture obtained serves as a dust.

Example 9

20 parts of active substance according to Example 2 are dissolved in a mixture of 48 parts of diacetone alcohol, 16 parts of xylene and 16 parts of an anhydrous, high molecular weight, condensation product of ethylene oxide with higher fatty acids. This concentrate may be diluted with water to give emulsions of any desired concentration.

Following the above procedure but employing as the active substance the compound of Example 7, a suitable concentrate is obtained which may be diluted with water to give emulsions of any desired concentration.

Example 10

50–80 parts of active substance according to Example 1 are mixed with 2–5 parts of a wetting agent, i.e. a sulphuric acid ester of an alkyl polyglycol ether, 1–5 parts of a protective colloid, i.e. spent sulphite liquor, and 14–44 parts of an inert solid carrier material, i.e. kaolin, and then ground finely in a suitable mill. The wettable powder obtained may be stirred into water and gives very stable suspensions.

In an analogous manner but utilising the active substance according to Example 5, a wettable powder is obtained which may be stirred into water and gives very stable suspensions. In place of kaolin in the above, bentonite, chalk or kieselguhr can be used with good results.

Example 11

10 parts of the active substance of Example 3 are dissolved in 60–80 parts of a high boiling organic liquid, i.e. coal tar oil, to which are added 30–10 parts of xylene.

Following the above procedure but employing the active substance of Example 7, a suitable dispersion is obtained. In place of coal tar oil above, diesel oil or spindle oil can be employed with good results.

Example 12

5–10 parts of the active substance of Example 4 are mixed and ground with 95–90 parts of calcium carbonate (=ground limestone). The product may be used as a scattering agent.

Example 13

95 parts of a granulated carrier material, i.e. sand are moistened with 1–5 parts of water, and then mixed with 5 parts of active substance in accordance with Example 1.

In place of water above, isopropanol or polyethylene glycol can be employed. Calcium carbonate can readily be substituted for the sand. Also a good dispersion is had following the above procedure but employing as the active substance the compound according to Example 6.

The above mixture, or a mixture containing more active substance, e.g. from 10 parts of active substance and 90 parts of calcium carbonate, may also be admixed with a multiple of its weight, e.g. 100–900 parts, of a synthetic fertiliser, water-soluble if desired, such as, for example, ammonium sulphate or urea.

Example 14

50 parts of active substance in accordance with Example 2 are introduced into 45 parts of xylene and 5 parts of a mixture of polyethylene oxide condensation products and spent sulphite liquor are added. A concentrate for the preparation of emulsions is obtained which can be emulsified in water in any proportions.

Employing as the active substance, the compound according to Example 7 in place of that according to Example 2 and following the above procedure, an applicable concentrate is obtained.

The amounts of active substance required per hectare vary in the selective control of weeds according to the sensitivity of the weeds, the capacity for resistance of the cultivated plants, the time of application, the climate, and 10 kg. per hectare, while for the complete prevention of plant growth, 5–20 kg. per hectare are generally applied. In special cases the above quantities may be exceeded.

Merely as exemplification of the plant growth inhibiting action, the following tests have been made:

Example 15

Seed boxes are filled with earth and then seeds of raygrass are sowed therein. Immediately after sowing one gramme of 2-cyano-4-methylamino-6-isopropyl-amino-s-triazine in 100 ml. of water is sprayed onto each square metre of the seed boxes' surface. The seeds begin to germinate normally but after twenty days all the plants are dead.

Example 16

A powder containing 10% of 2-cyano-4,6-bis-(ethylamino)-s-triazine and 90% of talcum is dusted onto young cotton plants having four to six leaves. After ten days, the cotton plants are completed defoliated.

Example 17

A 0.5% aqueous suspension of 2-cyano-4-isopropyl-amino-6-diethylamino-s-triazine is applied to mustard plants having a height of 15 to 20 centimetres. After seven days, the leaves of these mustard plants are completely burned and dried.

What is claimed is:

1. Method for inhibiting the growth of plants which comprises bringing into contact with at least a part of the plant, in an amount sufficient to inhibit plant growth, a compound of the formula

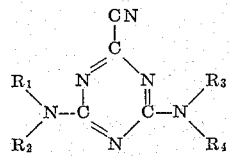

wherein $R_1$ is a member selected from the group consisting of lower alkyl, lower alkoxy(lower)alkyl, lower alkylmercapto(lower)alkyl, lower alkenyl, lower alkenyloxy(lower)alkyl and lower alkenylmercapto(lower)alkyl, and $R_2$, $R_3$ and $R_4$ independently of each other represent a member selected from the group consisting of hydrogen, lower alkyl, lower alkoxy(lower)alkyl, lower alkylmercapto(lower)alkyl, lower alkenyl, lower alkenyloxy(lower)alkyl and lower alkenylmercapto(lower)alkyl.

2. Method of inhibiting the growth of plants which comprises bringing into contact with at least a part of the plant an agricultural composition containing a compound of the formula

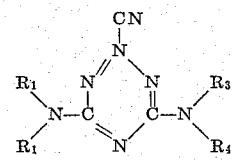

wherein $R_1$ is a member selected from the group consisting of lower alkyl, lower alkoxy(lower)alkyl, lower alkylmercapto(lower)alkyl, lower alkenyl, lower alkenyloxy(lower)alkyl and lower alkenylmercapto(lower)alkyl, and $R_2$, $R_3$ and $R_4$ independently of each other represent a member selected from the group consisting of hydrogen, lower alkyl, lower alkoxy(lower)alkyl, lower alkylmercapto(lower)alkyl, lower alkenyl, lower alkenyloxy(lower)alkyl and lower alkenylmercapto(lower)alkyl, in a concentration sufficient to inhibit plant growth.

3. Method of desiccating cultivated plants which comprises bringing into contact with at least a part of the plant, in an amount sufficient to inhibit plant growth, a compound of the formula

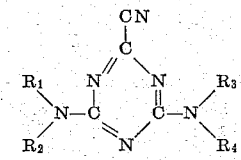

wherein $R_1$ is a member selected from the group consisting of lower alkyl, lower alkoxy(lower)alkyl, lower alkylmercapto(lower)alkyl, lower alkenyl, lower alkenyloxy(lower)alkyl and lower alkenylmercapto(lower)alkyl, and $R_2$, $R_3$ and $R_4$ independently of each other represent a member selected from the group consisting of hydrogen, lower alkyl, lower alkoxy(lower)alkyl, lower alkylmercapto(lower)alkyl, lower alkenyl, lower alkenyloxy(lower)alkyl and lower alkenylmercapto(lower)alkyl.

4. Method of defoliating cultivated plants which comprises bringing into contact with at least a part of the plant, in an amount sufficient to cause defoliation, a compound of the formula.

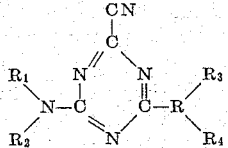

wherein $R_1$ is a member selected from the group consisting of lower alkyl, lower alkoxy(lower)alkyl, lower alkylmercapto(lower)alkyl, lower alkenyl, lower alkenyloxy(lower)alkyl and lower alkenylmercapto(lower)alkyl, and $R_2$, $R_3$ and $R_4$ independently of each other represent a member selected from the group consisting of hydrogen, lower alkyl, lower alkoxy(lower)alkyl, lower alkyl mercapto(lower)alkyl, lower alkenyl, lower alkenyloxy(lower)alkyl and lower alkenylmercapto(lower)alkyl.

5. Method of controlling weeds which comprises bringing into contact with at least a part of the weeds, in an amount sufficient to control weeds, a compound of the formula

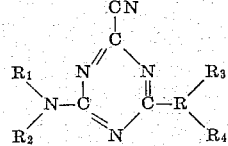

wherein $R_1$ is a member selected from the group consisting of lower alkyl, lower alkoxy(lower)alkyl, lower alkylmercapto(lower)alkyl, lower alkenyl, lower alkenyloxy(lower)alkyl and lower alkenylmercapto(lower)alkyl, and $R_2$, $R_3$ and $R_4$ independently of each other represent a member selected from the group consisting of hydrogen, lower alkyl, lower alkoxy(lower)alkyl, lower alkylmercapto(lower)alkyl, lower alkenyl, lower alkenyloxy(lower)alkyl and lower alkenylmercapto(lower) alkyl.

6. Method of inhibiting the growth of plants which comprises bringing into contact with at least a part of the plant, in an emount sufficient to inhibit plant growth, 2-cyano-4-ethylamino-6-isopropylamino-s-triazine.

7. Method of inhibiting the growth of plants which comprises bringing into contact with at least a part of the plant, in an amount sufficient to inhibit plant growth, 2-cyano-4,6-bis-isopropylamino-s-triazine.

8. A herbicidal composition comprising as an active herbicide, a triazine derivative of the formula

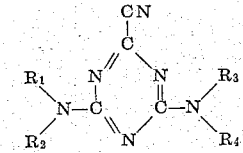

wherein $R_1$ is a member selected from the group consisting of lower alkyl, lower alkoxy(lower)alkyl, lower alkylmercapto(lower)alkyl, lower alkenyl, lower alkenyloxy(lower)alkyl and lower alkenylmercapto(lower)alkyl, and $R_2$, $R_3$ and $R_4$ independently of each other represent a member selected from the group consisting of hydrogent, lower alkyl, lower alkoxy(lower)alkyl, lower alkylmercapto(lower)alkyl, lower alkenyl, lower alkenyloxy(lower)alkyl and lower alkenylmercapto(lower)alkyl,
in a concentration sufficient to inhibit plant growth, and an agricultural adjuvant as carrier therefor.

9. A herbicidal composition comprising, as an active herbicide, 2 - cyano - 4-ethylamino-6-isopropylamino-s-triazine in a concentration sufficient to inhibit plant growth, and an agricultural adjuvant as carrier therefor.

10. A herbicidal composition comprising, as an active herbicide, 2-cyano-4,6-bis-isopropylamino-s-triazine in a concentration sufficient to inhibit plant growth, and an agricultural adjuvant as carrier therefor.

References Cited by the Examiner
UNITED STATES PATENTS

| | | | |
|---|---|---|---|
| 2,368,451 | 1/45 | D'Alelio | 260—249.5 |
| 2,394,526 | 2/46 | Thurston | 260—249.9 |
| 2,548,772 | 4/41 | Castle | 260—249.9 |
| 2,891,855 | 6/59 | Gysin et al. | 71—2.5 |
| 2,909,419 | 10/59 | Gysin et al. | 71—2.5 |
| 2,923,614 | 2/60 | Gysin et al. | 71—2.5 |
| 3,021,328 | 2/62 | Morin et al. | 71—2.5 X |

LEWIS GOTTS, *Primary Examiner.*

IRVING MARCUS, M. A. BRINDISI, *Examiners.*